Sept. 11, 1928.   C. G. HAWLEY   1,684,025
LINE FILTER
Filed March 9, 1926
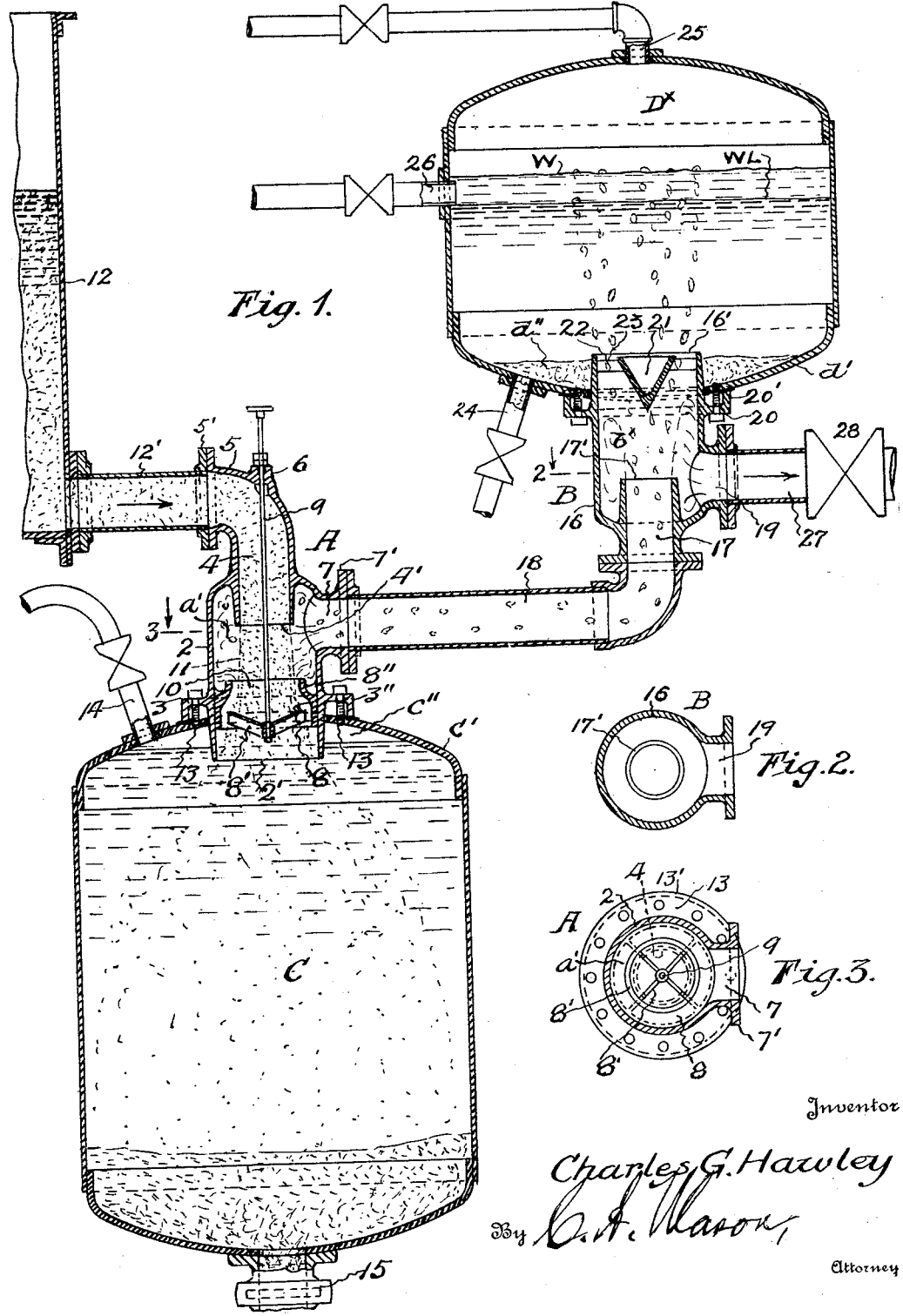
Inventor
Charles G. Hawley
By C. A. Mason,
Attorney Patented Sept. 11, 1928.

1,684,025

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

LINE FILTER.

Application filed March 9, 1926. Serial No. 93,462.

In particular, the invention relates to filtration as performed upon a flowing stream, without resort to the use of screens.

This invention has to do with the filtration or purification of water and other liquids, notably petroleum and chemical liquids.

The primary object of the invention is to provide a filter or purifier that shall be adapted for use in large sizes; and, for direct inclusion in large pipe lines, where a more or less continuous flow of liquid is maintained and from which it is desired to abstract substances that are foreign to the carrier liquid.

A special object of the invention is to provide a so-called filter head of the impact type made familiar in my companion application 93,275 and which shall be adapted for an attachment to and use with large reservoirs or drums in which the separated substances may be held for a time.

The invention will be readily understood on reference to the accompanying drawing, in which Fig. 1 is a vertical section of filtering apparatus embodying the present invention; Fig. 2 is a horizontal section on the line 2— of Fig. 1; and, Fig. 3 is a horizontal section on the line 3—.

It is very common to accomplish the separation of substances by a change of direction. By this invention the separation is accomplished in the same direction as that in which the liquid flows. I apprehend that therein lies the secret of the small loss or drop of pressure between the intake and the outlet of my novel filter. It will shortly be observed that this accomplishment of separation in the direction of flow, and before there is any change in the direction of the flow of the main carrying stream of fluid takes place in both of the separating actions that characterize this filter. Thus, in the first stage of action the flowing stream of liquid is caused to impact the relatively non-resistant surface of a substantially quiescent body of the same liquid with the result that the heavier particles carried by the entering stream are lodged in and sink below said non-resistant surface, much as a bullet is brought to a stop on penetrating a bank of earth, as contrasted with the action of a bullet when shot against a steel plate. Then follows the second stage or step of the process which I term an upward impact separation, and wherein the lighter substances that may be carried by the fluid, for example, light oils, and gases are separated from the flowing stream; again, in the direction of its flow. Such is the complete process of my invention and thereby liquids can be freed of substantially all foreign substances that are not in an actual state of solution.

In the second step of the operation as above outlined there is a difference to be observed over the first impact stage or step. The substances which are separated in the direction of the flow are separated by the impulsion of the main stream in that direction aided by gravity as represented by the difference in weight of the lighter substances and the carrying fluid. Instead of the analogy of the bullet and the bank of earth, the analogy for the second step of the operation may be more suitably found in a lighter object which is being driven into a heavier substance by the force of a hammer that either acts with such frequency, or with such suddenness as to propel the lighter object into the heavier substance without breaking up the lighter article. Obviously the operation may be reversed, first removing the lighter substances and then the heavier impurities.

The process is purely mechanical in its nature. Its functions and effects as reviewed from a chemical standpoint are necessarily incidental to the mechanical operations.

Each step of the process and each part of the apparatus is capable of separate use in cases that for one reason or another do not require the other.

It is believed that the foregoing brief statement will serve to properly supplement and clarify the following detailed description of the apparatus and its operation.

The apparatus here shown embraces two of the aforementioned filter heads. These are marked A and B respectively, and closely resemble each other. They are relatively inverted as required by the work to be done.

The head A comprises a cylindrical body portion 2 provided with an intermediate flange 3. The latter has a perpendicular extension 3', to be again referred to. The top of the body 2 is entered by the downward direction pipe 4, which is about one-half the diameter of the body 2. At the top, the pipe is formed into an elbow 5, having a suitable pipe flange 5'. It is also characterized by the central boss 6. Near its top and laterally opposite the lower end 4' of the down pipe 4, is the fluid outlet 7, also provided with a suitable pipe flange 7'. The interior of the body is bored to receive the ring-like member 8; which is adapted to slide vertically therein. It is so adjusted by means of the central rod 9, that extends through the boss 6 and is there adjustably fastened. The attachment between the rod and the ring is made by means of the arms 8'. The top of the ring is characterized by a smaller or constricted collar 8", which forms the impact orifice 10 of the filter. That orifice 10 is somewhat larger than the pipe 4, to allow for the expansion of the downward moving stream as indicated by the dotted lines 11 of Fig. 1, and as better explained hereinafter.

Attention is called to the fact that a commodious space $a'$ is provided within the head A and surrounding the stream next above mentioned.

The tank 12 represents any suitable source of the liquid to be filtered or treated. The liquid enters the filter head through the connection 12', that joins the elbow 5.

The filter or purifier head A is attached to the top of the sludge drum or reservoir C. To this end, the flange 3' of the filter head is shaped to fit tightly against the top $c'$ of the drum C and is secured thereto by a plurality of bolts 13.

The lower end 2' of the body 2 extends downward through a central opening in the top $c'$. It projects considerably below the drum top and thus completes the trap space $c''$ in the top of the drum C. 14 represents a blow-off pipe that leads from the trap space $c''$ last mentioned.

15 represents a sludge discharging valve at the bottom of the drum C.

The head B comprises a body portion 16 that is closed at the lower end and open at its upper end 16'. The lower end is entered by the upward direction pipe 17. The latter is joined by the pipe 18, that leads from the outlet 7, of the head A. The outlet 19, of the head B, is positioned at the lower end of the head, opposite the upper end 17' of the direction pipe 17. The head 16 has flanges 20 and 20', corresponding to the flanges 3 and 3', and is thereby attached to the bottom $d'$ of the large dome or drum D. Preferably, the upper end of the body 16 contains an intermediate cone 21, supported therein by arms 22, and forming the annular impact separation space 23 above the outlet 19. The upper end of the body extends far enough into the drum D to form a collection space $d''$ in the bottom thereof for the reception of any sediment that may be lifted into the drum by the force of the upgoing stream from the direction pipe 17. 24 is a drain pipe by which the sediment may be removed without otherwise emptying the drum. The top of the drum contains a valved gas outlet 25; and part way down on the side of the drum, is a valved light liquid outlet 26 for the discharge of the floating substances.

The line WL represents the upper surface of the liquid under treatment. The line W represents the top surface of a lighter liquid that has accumulated thereon.

27 represents the line pipe which leads the purified liquid away from the filter outlet 19.

It will be noted that there are no valves within the liquid passages and spaces of this filtering apparatus. The valve 28 in the line pipe 27 serves to control the flow from the tank or other source.

Normally the apparatus is filled with liquid and the same rises in the drum D, substantially to the height of the liquid at the source. However, the level WL in the drum may be controlled by leaving a body of gas under pressure in the drum top $D^x$.

When the line valve 28 is opened, the liquid flows through the following parts, to wit: 12', 5, 4, $a'$, 7, 18, 17, $b'$, 19 and 27. The flow should not penetrate either drum C or D. Instead, the stream of liquid pouring downward from the direction pipe 4, squarely impacts the surface of the liquid, occupying the drum C, at the top of the ring 8. The expanded stream as indicated by the lines 11, substantially fills the orifice 8" at the top of the drum C, and as will be apparent, impacts a quiescent body of liquid in the orifice and drum. The top or surface of that body furnishes the non-resistant impact surface as above mentioned. The downward moving heavier substances contained by the liquid impact and penetrate this surface and thus start down into the drum C, while the carrier liquid moves outward into the surrounding space A and thence leaves the head A through the passage 7. By raising or lowering the orifice ring 8 (by means of the adjusting rod 9) it is easy to secure the proper relation between, and the best functioning of, the directing nozzle 4' and the orifice ring 8. By moving the latter downward it is accommodated to higher liquid velocities. By raising it, the filter is made efficient with a slowly moving stream of liquid.

Usually, the heavier substances, whether liquids or solids are allowed to accumulate in the bottom of the drum C for considerable periods and are drained or blown off at intervals.

Leaving the filter head, A, the liquid which has been freed of the heavier substances, passes to the head B. The stream being vertically directed by the pipe 17, passes the outlet 19 and impacts the liquid which fills the upper part of the head B and the lower part of the drum D. In so doing, the lighter oils, the bubbles of gas, or other floatable substances, are delivered into the lower part of the drum D, whence they immediately rise to and above the liquid level WL. The function of the central cone 21 is to limit the upward penetration of the stream from the pipe 7 without preventing the rise of the lighter particles; and, to prevent a tendency toward a vortexial return flow from the drum D into the head B.

The finally purified carrier liquid is discharged through the lateral opening 19, as before indicated. The lighter substances separated at the surface WL may be removed continuously or intermittently.

The herein described process and apparatus for forcibly separating solids, stratifiable liquids and gases are capable of considerable modification; as will be readily apparent to those who are skilled in the art; and, the apparatus is capable of widely different uses.

Having thus described my invention I claim as new and desire to secure by Letters Patent:

1. The improvement herein described, comprising a generally cylindrical and longitudinally extended head, closed at one end and open at the other, in combination with a direction pipe substantially coaxial with said head and extending inward through the closed end thereof, an outlet extending from the side of said head, laterally opposite the inner end of said pipe, and, a flange upon the exterior of said head, for its attachment to a drum or pocket.

2. The improvement herein described, comprising a generally cylindrical and longitudinally extended head, closed at one end and open at the other, in combination with a direction pipe substantially coaxial with said head and extending inward through the closed end thereof, an outlet extending from the side of said head, laterally opposite the inner end of said pipe, and a separating orifice ring forming the open end of said head, of less diameter than said head and of greater diameter than said pipe.

3. The improvement herein described, comprising a generally cylindrical and longitudinally extended head, closed at one end and open at the other, in combination with a direction pipe substantially coaxial with said head and extending inward through the closed end thereof, an outlet extending from the side of said head, laterally opposite the inner end of said pipe, an orifice ring forming the open end of said head, of less diameter than said head, of greater diameter than said pipe, and slidably longitudinal in said head, and means for sliding and holding said ring.

4. The improvement herein described, comprising a generally cylindrical and longitudinally extended head, closed at one end and open at the other, in combination with a direction pipe substantially coaxial with said head and extending inward through the closed end thereof, an outlet extending from the side of said head, laterally opposite the inner end of said pipe, and means for limiting back-flow, which means form an annular impact separation space at the open end of said head.

In testimony whereof I have hereunto set my hand this 8th day of March, A. D. 1926.

CHARLES GILBERT HAWLEY.